United States Patent
Lebisch et al.

(10) Patent No.: US 6,739,406 B2
(45) Date of Patent: May 25, 2004

(54) MACHINE TOOL WITH A CHAMBER FOR LUBRICATING AGENT AND A PRESSURE EQUALIZATION DEVICE FOR SAID CHAMBER

(75) Inventors: Helmut Lebisch, Stuttgart (DE); Otto Baumann, Leinfelden-Echterdingen (DE); Rolf Mueller, Leinfelden-Echterdingen (DE); Dietmar Saur, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 10/130,378

(22) PCT Filed: Aug. 31, 2001

(86) PCT No.: PCT/DE01/03359

§ 371 (c)(1), (2), (4) Date: Aug. 27, 2002

(87) PCT Pub. No.: WO02/22316

PCT Pub. Date: Mar. 21, 2002

(65) Prior Publication Data

US 2003/0121684 A1 Jul. 3, 2003

(30) Foreign Application Priority Data

Sep. 15, 2000 (DE) .......................................... 100 45 620

(51) Int. Cl.$^7$ .............................................. E21B 10/22
(52) U.S. Cl. ...................... 173/213; 173/216; 173/104; 173/171
(58) Field of Search ............................... 173/104, 213, 173/216, DIG. 3, 171; 184/6.14, 64, 102, 106; 192/105 B

(56) References Cited

U.S. PATENT DOCUMENTS

| | | | | |
|---|---|---|---|---|
| 1,956,644 A | * | 5/1934 | Hamerly | 184/55.1 |
| 3,162,268 A | * | 12/1964 | Short | 184/5 |
| 3,946,490 A | * | 3/1976 | Sotman et al. | 433/82 |
| 4,183,414 A | * | 1/1980 | Tamai et al. | 173/118 |
| 4,403,679 A | * | 9/1983 | Snider | 184/64 |
| 4,497,380 A | | 2/1985 | Flack et al. | |
| 5,293,959 A | * | 3/1994 | Kimberlin | 184/6.14 |
| 5,437,356 A | * | 8/1995 | Lohr | 192/105 BA |
| 5,450,925 A | * | 9/1995 | Smith et al. | 184/5 |
| 5,638,935 A | * | 6/1997 | Fehring | 192/105 B |
| 6,109,366 A | * | 8/2000 | Jansson et al. | 173/216 |

FOREIGN PATENT DOCUMENTS

DE 42 31 987 3/1994

* cited by examiner

Primary Examiner—Scott A. Smith
Assistant Examiner—Chukwurah Nathaniel
(74) Attorney, Agent, or Firm—Kenyon & Kenyon

(57) ABSTRACT

The present invention is directed to a machine tool, in particular to a hand-operated hammer drill, having a compartment (10) containing lubricant in which at least one rotationally drivable component (12) is mounted and having a device (14) for compensating the pressure in the compartment (10), the device having a rotationally drivable centrifugal component (16) which shields at least one pressure-compensation channel (18) disposed downstream from it, in terms of fluid mechanics, in the venting direction of the compartment (10).

It is proposed that the centrifugal component (16) be mounted in a torsionally fixed manner on the rotationally drivable component (12).

10 Claims, 2 Drawing Sheets

100

MACHINE TOOL WITH A CHAMBER FOR LUBRICATING AGENT AND A PRESSURE EQUALIZATION DEVICE FOR SAID CHAMBER

BACKGROUND INFORMATION

The present invention is directed to a machine tool having a compartment containing lubricant and a device for compensation of the pressure in the compartment according to the definition of the species in claim 1.

A machine tool forming the species, in particular a hand-operated hammer drill, is known from German Patent 42 31,987.0 A1. The hammer drill has a drive motor, arranged within a motor compartment of a housing, having a motor shaft that extends through a housing section into a gear compartment, where it engages, via an integral pinion, with a gear wheel of a gear unit for driving a tool-holding fixture. The gear compartment is provided with a pressure-compensation device that reduces a pressure, resulting during operation within the gear compartment, down to that of the atmosphere or of the motor compartment. The pressure-compensation device has a pressure-compensation channel leading from the gear compartment to the outside, or to the motor compartment, implemented as a bore hole, that is introduced into a housing part.

The pressure-compensation channel is shielded by a rotary element or centrifugal component, rotationally mounted in the gear compartment on a pin that is integrally formed on the housing part. The rotary element is formed by a pot-shaped sheet-metal part into which a passage is introduced. The rotary element is operably connected to the gear wheel of the gear unit that is driven via the pinion, and specifically via a compression spring whose ends engage the gear wheel, on the one side, by form-fitting connection and the rotary element, on the other side, by frictional connection. The compression spring transfers the rotary movement of the gear wheel to the rotary element.

SUMMARY OF THE INVENTION

The present invention is directed to a machine tool, in particular to a hand-operated hammer drill, having a compartment containing lubricant in which at least one rotationally drivable component is mounted, and having a device for compensating the pressure in the compartment, the device having a rotationally drivable centrifugal component that shields at least one a pressure-compensation channel disposed downstream from it, in terms of fluid mechanics, in the venting direction of the compartment.

It is proposed that the centrifugal component be mounted in a torsionally fixed manner on the rotationally drivable component. It is possible to avoid additional components driving the centrifugal component, thereby saving space, weight, assembly effort and costs. If the rotationally drivable component is formed by a shaft, and if the centrifugal component adjoins a transmission means mounted on the shaft and extending in a radial direction, for example a gear wheel, a bevel gear of an infinitely variable gear unit, a V-belt pulley, etc., a large radial distance between an outer diameter of the centrifugal component and the pressure-compensation channel may be beneficially achieved using few additional components, thereby achieving a beneficial shielding effect. Furthermore, a long pressure-compensation channel, and an associated beneficial labyrinth and sealing effect, is attainable using a simple design. However, it is also conceivable, in principle, for the centrifugal component to be adjacent to a component separate from the transmission means, for example, a partition wall of a housing or a component additionally provided for this, etc.

It is proposed in another embodiment of the present invention, it is proposed that the centrifugal component be formed of a disk that extends axially toward the transmission means, conically radially to the outside. A beneficial shielding effect may thereby be achieved, and this is the case in particular, if the centrifugal component is positioned upstream of the transmission means, in terms of fluid mechanics, in the venting direction of the compartment.

If, in the radially outer area of the centrifugal component designed as a disk, at least one recess forming a pressure-compensation channel is placed in the centrifugal component and/or in the transmission means, a desired flow cross-section may be simply and deliberately set, via which pressure is intended to be equalized. Furthermore, it is possible to ensure that lubricant that has gotten into a space bordered by the centrifugal component and the transmission means is able to flow back. However, it is also possible for the centrifugal component to adjoin the transmission means with small clearance, so that between the transmission means and the centrifugal component, a groove seal is formed via which pressure may be compensated, but which at least substantially prevents lubricant from escaping from the compartment.

Furthermore, the shielded pressure-compensation channel is beneficially formed at least partially by a threaded depression, which, except for an inlet, shielded by the centrifugal component, in the compartment, is covered in a lubricant-tight manner. A beneficial labyrinth effect or labyrinth sealing may be achieved, and a recirculating effect as well; and specifically, by coordinating the threading and rotational directions accordingly. The threaded depression may be introduced into one or more components mounted on the rotationally drivable component, for example, in the transmission means, in a bearing ring of a bearing of the rotationally drivable component, etc. However, the threaded depression is advantageously introduced into the rotationally drivable component designed as a shaft. The depression may beneficially be placed in a component in one processing step, and the depression may advantageously be covered, at least substantially in a lubricant-tight manner, depending on the centrifugal component, using already existing components. If the pressure-compensation channel opens through into at least one annular groove, it can be produced especially simply and economically, for example, in one lathe operation, starting from a first annular groove and opening through into a second annular groove or at an end face.

In another embodiment of the present invention, it is proposed to position a sealing ring that seals the depression in the radial direction, between the transmission means and a bearing of the rotationally drivable component. Starting from the centrifugal component, a threaded depression introduced into the rotationally drivable component, designed as a shaft, may be advantageously covered in a lubricant-tight manner by the transmission means, by the sealing ring and by the bearing. Furthermore, the sealing ring may also be used to seal the compartment outwardly, in the area of the bearing, in a lubricant-tight manner. Overall, therefore, except for the centrifugal component, the need is eliminated for additional components for the pressure-compensation device.

The approach of the present invention is applicable to all machine tools deemed suitable by one skilled in the art, in particular in hand-operated machine tools, such as, grinders, saws, milling cutters, planers, drills, chisel hammers, etc.

BRIEF DESCRIPTION OF THE DRAWINGS

Further advantages are derived from the following description of the drawings. The drawing shows an exemplary embodiment of the present invention. The drawing, the Specification and the claims contain numerous features in combination. One skilled in the art is advised to also examine the features individually, and to combine them to form further useful combinations.

DESCRIPTION OF THE EXEMPLARY EMBODIMENT

Figure 1:
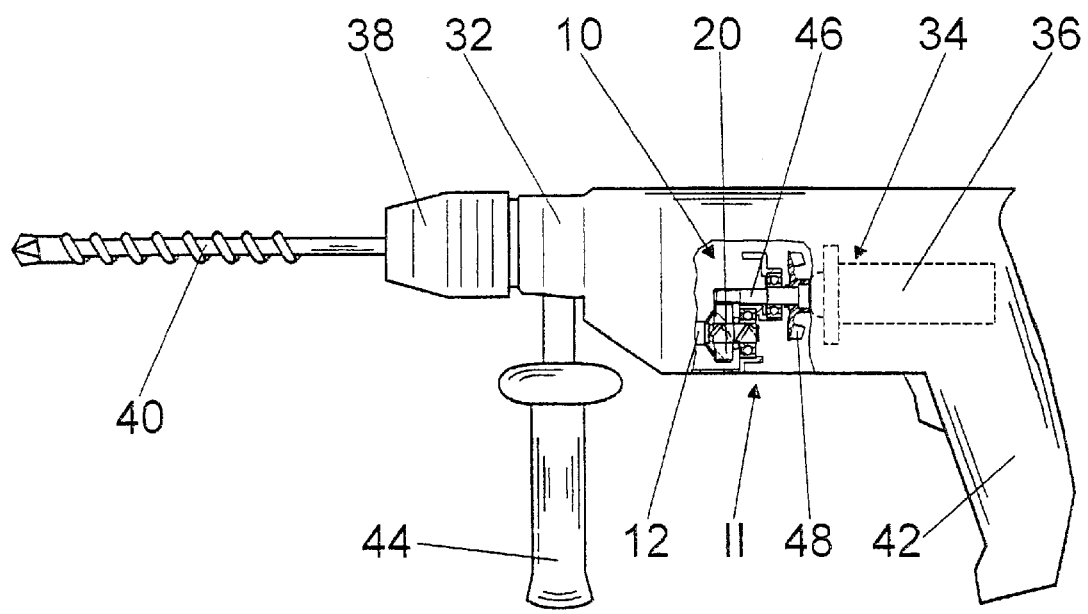
FIG. 1 shows a schematically illustrated hammer drill from the side.

FIG. 1 shows a schematically illustrated hammer drill having a housing 32 in which a drive motor 36 is supported within a motor compartment 34. Via a gear unit (not shown in greater detail) mounted in a gear compartment 10, a tool holder 38 and a drill bit 40 secured in tool holder 38 are able to be driven, so as to allow rotary and percussial action, by drive motor 36. The hammer drill may be guided using two hand grips 42, 44 that extend essentially perpendicularly to an operating direction, one handgrip 42 on a side facing away from bit 40 being integrally formed on housing 32, and one handgrip 44 on a side facing toward bit 40, being secured to housing 32.

Figure 2:
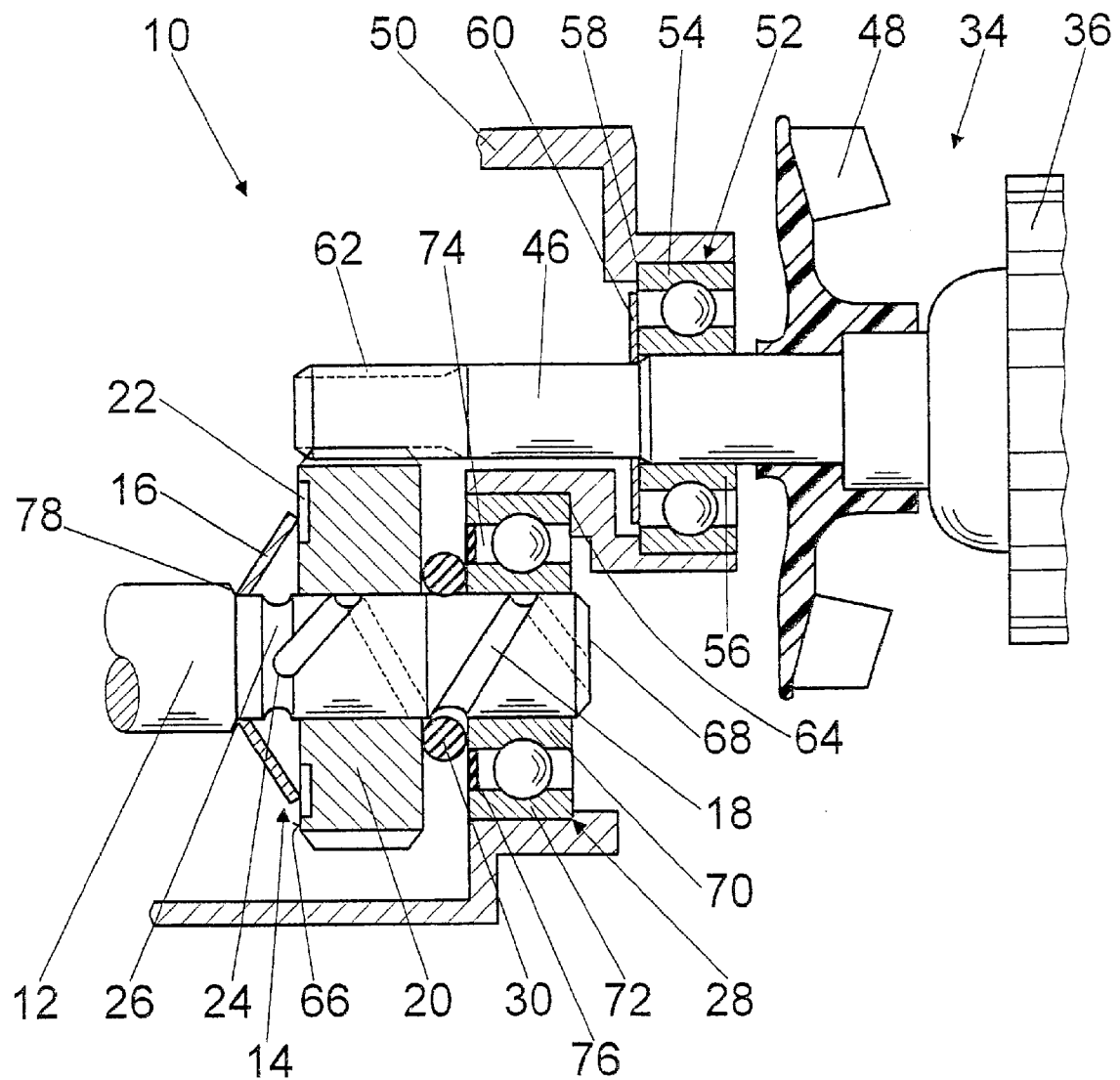
FIG. 2 shows a detail of the section designated by II in FIG. 1.

Drive motor 36 has a drive shaft 46 on which a fan impeller 48 is mounted in a torsionally fixed manner within motor compartment 34 (FIG. 2). Drive shaft 46 projects from motor compartment 34 through a partition wall 50, made of aluminum, into gear compartment 10 and is rotationally mounted in partition wall 50 via a ball bearing. Ball bearing 52 is joined by its outer ring 54 in a press-fit connection, to partition wall 50, and is joined by its inner ring 56 in a torsionally fixed manner, to drive shaft 46. Ball bearing 52 is designed as a fixed bearing, and, specifically, is supported axially, in the direction of gear compartment 10, against a shoulder 58 in partition wall 50, and is axially supported in the direction of motor compartment 34, against a retaining ring (not shown) secured within partition wall 50. Gear compartment 10, filled with lubricant, is sealed in an airtight and lubricant-tight manner at ball bearing 52 via a sealing washer 60 in the direction of motor compartment 34.

Integrally formed on one end of drive shaft 46 projecting into gear compartment 10 is a pinion 62, via which drive shaft 46 mates with a gear wheel 20 that is mounted in a torsionally fixed manner on an intermediate shaft 12 of the gear unit. Intermediate shaft 12 is rotationally mounted via a ball bearing 28 in partition wall 50. Ball bearing 28 is mounted in a torsionally fixed manner via a press-fit by way of its inner ring 70 on intermediate shaft 12, and by way of its outer ring 72 via a press-fit in partition wall 50. Ball bearing 28 is supported by its outer ring 72 in the axial direction with respect to motor compartment 34, against a shoulder 64 in partition wall 50.

A pressure prevailing in gear compartment 10 may be compensated via a pressure-compensation device 14, and, in particular, a buildup of pressure in gear compartment 10 due to heating during operation of the hammer drill may be prevented. According to the present invention, pressure-compensation device 14 has a centrifugal component 16, which is formed of a sheet-metal disk and arranged in a torsionally fixed manner on intermediate shaft 12, and, which is disposed upstream from gear wheel 20, in terms of fluid mechanics in the venting direction of gear compartment 10, extends axially with respect to gear wheel 20, conically radially to the outside, and adjoins on end to a face 66 of gear wheel 20. Centrifugal component 16 is pretensioned in the axial direction, and, in this context, is supported in the direction of gear compartment 10 against a shoulder 78 on intermediate shaft 12 and, in the direction of motor compartment 34, against end face 66 of gear wheel 20. In the radially outer area of centrifugal component 16, recesses 22 forming pressure-compensation channels are introduced in face 66 of gear wheel 20.

Centrifugal component 16 shields a pressure-compensation channel 18 that is disposed downstream from it, in terms of fluid mechanics, in the venting direction of gear compartment 10 and is formed of a threaded depression that is placed in intermediate shaft 12. The depression extends in an axial direction with respect to motor compartment 34, starting from an annular groove 26, in front of gear wheel 20 up to a face 68 of intermediate shaft 12 protruding into motor compartment 34. Except for an inlet 24 in the area of annular groove 26, the depression is covered in a lubricant-tight manner and, to be specific, by gear wheel 20, by a sealing ring 30 positioned between gear wheel 20 and ball bearing 28, and by inner ring 70 of ball bearing 28. A bearing gap 74 between inner ring 70 and outer ring 72 is sealed off in an airtight and lubricant-tight manner by a sealing washer 76.

Instead of an intermediate shaft 12, a drive shaft may likewise be used to implement an appropriate pressure-compensation device.

List of Reference Numerals 10 compartment
12 component
14 pressure-compensation device
16 centrifugal component
18 pressure-compensation channel
20 transmission means
22 recess
24 inlet
26 annular groove
28 bearing
30 sealing ring
32 housing
34 motor compartment
36 drive motor
38 tool holder
40 drive bit
42 hand grip
44 hand grip
46 drive shaft
48 fan impeller
50 partition wall
52 ball bearing
54 outer ring
56 inner ring
58 shoulder
60 sealing washer
62 pinion gear
64 shoulder
66 face
68 face
70 inner ring
72 outer ring
74 bearing gap
76 sealing washer
78 shoulder

What is claimed is:

1. A machine tool, comprising:
   a compartment containing a lubricant;
   at least one rotationally drivable component mounted in the compartment;
   a device for compensating a pressure in the compartment, the device including a rotationally drivable centrifugal component mounted in a torsionally fixed manner on the at least one rotationally drivable component; and
   at least one pressure-compensation channel disposed downstream from the centrifugal component, in terms of fluid mechanics, in a venting direction of the compartment, the at least one pressure-compensation channel being shielded by the centrifugal component.

2. The machine tool according to claim 1, wherein the machine tool is a hand-operated hammer drill.

3. The machine tool according to claim 1, wherein the at least one rotationally drivable component is formed as a shaft, the machine tool further comprising:
   a transmission arrangement mounted on the shaft and extending in a radial direction, the centrifugal component adjoining the transmission arrangement.

4. The machine tool according to claim 3, wherein the centrifugal component is formed as a disk that extends axially towards the transmission arrangement, conically radially to an outside.

5. The machine tool according to claim 4, further comprising:
   wherein at least one of a radially outer area of the centrifugal component and the transmission arrangement has at least one recess forming the pressure-compensation channel.

6. The machine tool according to claim 4, further comprising:
   a threaded depression at least partially forming the pressure-compensation channel, the threaded depression being covered in a lubricant-tight manner except for an inlet which is shielded by the centrifugal component in the compartment.

7. The machine tool according to claim 6, wherein the rotationally drivable component includes the threaded depression.

8. The machine tool according to claim 6, further comprising:
   an annular groove, wherein the threaded depression opens into the annular groove in a direction contrary to the venting direction of the compartment.

9. The machine tool according to claim 3, wherein the centrifugal component is positioned upstream of the transmission arrangement, in terms of fluid mechanics, in the venting direction of the compartment.

10. The machine tool according to claim 9, wherein the at least one rotationally drivable component includes a bearing, and wherein a sealing ring seals the threaded depression in a radial direction, the sealing ring being arranged between the transmission arrangement and the bearing.

* * * * *

UNITED STATES PATENT AND TRADEMARK OFFICE
CERTIFICATE OF CORRECTION

PATENT NO. : 6,739,406 B2
DATED : May 25, 2004
INVENTOR(S) : Lebisch, Helmut et al.

It is certified that error appears in the above-identified patent and that said Letters Patent is hereby corrected as shown below:

Title page,
*Assistant Examiner*, change the name from "Chukwurah Nathaniel" to -- Nathaniel C. Chukwurah --.
Item [57], ABSTRACT,
Line 1, change "The present invention is directed to a machine tool," to -- A machine tool, --.
Lines 2-3, change "hammer drill having a compartment (10)" to -- hammer drill is described. The tool has a compartment --.
Line 4, delete "(12)".
Line 5, delete "(14)".
Lines 5-6, change "in the compartment (10), the device having" to -- in the compartment. The device has --.
Line 7, delete "(16)".
Line 8, delete "(18)".
Line 9, change "terns of" to -- terms of --.
Line 10, delete "(10)".
Line 12, change "It is proposed that the centrifugal component (16) be" to -- The centrifugal component is --.
Line 14, delete "(12)".

Column 1,
Line 7, change "Background Information" to -- Field of the Invention --.
Lines 10-11, change "the compartment, according to...claim 1." to -- the compartment. --.
Line 12, insert heading -- Background Information --.
Line 13, change "tool, forming the species," to -- tool, --.
Lines 14-15, change "is known from German Patent 42 31,987.0A1." to -- is described in German Published Patent Application No. 42 31 987.0. --.
Line 15, change "drill has a drive motor," to -- drill may include a drive motor --.
Lines 16-17, change "a housing, having a motor shaft that extends" to -- a housing. A motor shaft that extends --.
Line 20, change "is provided with" to -- may be provided with --.
Line 21, change "device that reduces" to -- device that may reduce --.
Line 23, change "device has" to -- device may include --.
Line 28, change "channel is shielded" to -- channel may be shielded --.

UNITED STATES PATENT AND TRADEMARK OFFICE
CERTIFICATE OF CORRECTION

PATENT NO.     : 6,739,406 B2
DATED          : May 25, 2004
INVENTOR(S)    : Lebisch, Helmut et al.

It is certified that error appears in the above-identified patent and that said Letters Patent is hereby corrected as shown below:

Column 1 (cont'd),
Line 31, change "element is formed" to -- element may be formed --.
Line 33, change "element is operably connected" to -- element may be operably connected --.
Line 38, change "spring transfers" to -- spring may transfer --.
Line 42, change "The present invention is directed to a machine tool," to -- According to an exemplary embodiment of the present invention, a machine tool is provided, --.
Line 45, change "is mounted and having a device" to -- is mounted. The tool includes a device --.
Lines 46-47, change "in the compartment, the device having" to -- in the compartment. The device has --.
Line 51, change "It is proposed that the centrifugal component be mounted" to -- The centrifugal component may be mounted --.
Lines 53-54, change "It is possible to avoid additional components driving the centrifugal component," to -- Additional components driving the centrifugal component may be avoided, --.
Line 57, change "a transmission means" to -- a transmission arrangement --.
Line 62, change "may be beneficially achieved" to -- may be achieved --.
Lines 63-64, change "a beneficial shielding effect." to -- a shielding effect. --.
Line 65, change "an associated beneficial labyrinth" to -- an associated labyrinth --.
Line 66, change "is attainable using a simple design." to -- may be attainable using a simple configuration. --.
Lines 66-67, delete "it is also conceivable, in principle, for".
Line 67, change "component to" to -- component may also --.

Column 2,
Line 2, change "means, for example," to -- arrangement, for example, --.
Line 4, change "It is proposed in another embodiment" to -- In another example embodiment --.
Line 5, change "invention it is proposed that" to -- invention, --.
Line 5, change "component be" to -- component may be --.
Line 6 change "of a disk" to -- as a disk --.
Line 7, change "means, conically" to -- arrangement, conically --.
Line 7, change "A beneficial shielding effect" to -- A shielding effect --.
Line 8, change "is the case" to -- may be the case --.
Line 10, change "transmission means," to -- transmission arrangement, --.
Line 11, change "designed as a disk" to -- formed as a disk --.
Line 15, change "transmission means," to -- transmission arrangement, --.
Line 17, change "is intended to be" to -- may be --.

UNITED STATES PATENT AND TRADEMARK OFFICE
CERTIFICATE OF CORRECTION

PATENT NO.   : 6,739,406 B2
DATED        : May 25, 2004
INVENTOR(S)  : Lebisch, Helmut et al.

It is certified that error appears in the above-identified patent and that said Letters Patent is hereby corrected as shown below:

Column 2 (cont'd),
Lines 17-18, change "it is possible to ensure that" to -- it may be ensured that --.
Lines 19-20, change "transmission means" to -- transmission arrangement --.
Line 20, delete "it is also possible for".
Line 21, change "to adjoin the transmission means" to -- may adjoin the transmission arrangement --.
Lines 22-23, change "transmission means" to -- transmission arrangement --.
Line 23, change "groove seal is" to -- groove seal may be --.
Line 25, change "at least substantially prevents" to -- may at least prevent --.
Line 28, change "is beneficially formed" to -- may be formed --.
Line 30, change "is covered" to -- may be covered --.
Line 31, change "A beneficial labyrinth effect" to -- A labyrinth effect --.
Line 37, change "transmission means," to -- transmission arrangement, --.
Line 39, change "is advantageously introduced" to -- may be introduced --.
Line 40, change "designed as" to -- configured as --.
Line 41, change "may beneficially be placed" to -- may be placed --.
Line 42, change "may advantageously be covered" to -- may be covered --.
Lines 46-47, change "produced especially simply" to -- produced simply --.
Line 50, change "In another embodiment" to -- In another example embodiment --.
Lines 50-51, delete "it is proposed to position".
Line 52, change "direction, between the transmission means" to -- direction, may be positioned between the transmission arrangement --.
Lines 55-56, change "designed as a shaft, may be advantageously covered" to
-- configured as a shaft, may be covered --.
Line 57, change "transmission means" to -- transmission arrangement --.
Line 61, change "the need is eliminated" to -- the requirement may be eliminated --.
Lines 64-65, change "is applicable to all machine tools" to -- may be applicable to other machine tools --.
Line 65, change "machine tools, deemed suitable by one skilled in the art" to -- machine tools, --.

UNITED STATES PATENT AND TRADEMARK OFFICE
CERTIFICATE OF CORRECTION

PATENT NO. : 6,739,406 B2
DATED : May 25, 2004
INVENTOR(S) : Lebisch, Helmut et al.

It is certified that error appears in the above-identified patent and that said Letters Patent is hereby corrected as shown below:

Column 3,
Lines 3-9, delete "Further advantages...useful combinations.".
Line 10, change "Fig. 1 shows a schematically illustrated hammer drill" to -- Fig. 1 schematically illustrates a side view of a hammer drill. --.
Line 11, delete "from the side; and".
Line 24, change "that extend essentially" to -- that extend generally --.
Lines 53-54, change "by way if its inner ring" to -- via its inner ring --.
Line 54, change "and by way of" to -- and via --.
Line 63, change "According to the present invention," to -- According an example embodiment of the present invention, --.
Line 65, change "formed of a sheet-metal disk" to -- formed as a sheet-metal disk --.

Signed and Sealed this

Thirtieth Day of August, 2005

JON W. DUDAS
*Director of the United States Patent and Trademark Office*